(12) United States Patent
Benson et al.

(10) Patent No.: US 6,649,006 B2
(45) Date of Patent: Nov. 18, 2003

(54) METHOD OF MAKING A WAFFLE STIFFENER

(75) Inventors: Ross A. Benson, Willow Park, TX (US); Terrance R. Burd, Arlington, TX (US); Todd H. Ashton, Forth Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 129 days.

(21) Appl. No.: 09/973,217

(22) Filed: Oct. 9, 2001

(65) Prior Publication Data

US 2003/0068472 A1 Apr. 10, 2003

(51) Int. Cl.$^7$ ............................................. B32B 31/04
(52) U.S. Cl. .................... 156/245; 264/258; 428/180; 428/188; 428/190; 425/408; 52/783.11
(58) Field of Search ................... 156/245; 264/241, 264/258, 319; 428/180, 190, 188; 425/408, 412, 423; 52/783.11; 249/60, 203

(56) References Cited

U.S. PATENT DOCUMENTS 4,664,862 A    5/1987  Ghavamikia
5,069,737 A  * 12/1991  Guiton ........................ 156/210
5,707,576 A  *  1/1998  Asher ......................... 264/258
5,904,992 A  *  5/1999  Yasui ......................... 428/593
6,553,734 B1 *  4/2003  McKague, Jr. et al. .... 52/309.1

FOREIGN PATENT DOCUMENTS

DE    3739753 A1    6/1989
EP    0373729       6/1990
EP    1134070 A1    9/2001

* cited by examiner

Primary Examiner—Jeff H. Aftergut
Assistant Examiner—Jessica Rossi
(74) Attorney, Agent, or Firm—Bracewell & Patterson, L.L.P.

(57) ABSTRACT

An apparatus and method for stiffening a panel provides a composite waffle stiffener and the method for constructing the stiffener. A plurality of fabric plies pre-cut to a selected pattern are laid on a tool having a waffle configuration, the plies overlapping each other to maintain continuity of the structure. The resulting waffle stiffener is then bonded to a panel requiring stiffening. The stiffener is flexible and may be bonded to curved panels. Holes in the stiffener allow access to the volume between the stiffener and the panel for minimizing volume loss within, for example, a wing structure containing fuel and for ventilating air or moisture trapped in the volume.

14 Claims, 4 Drawing Sheets

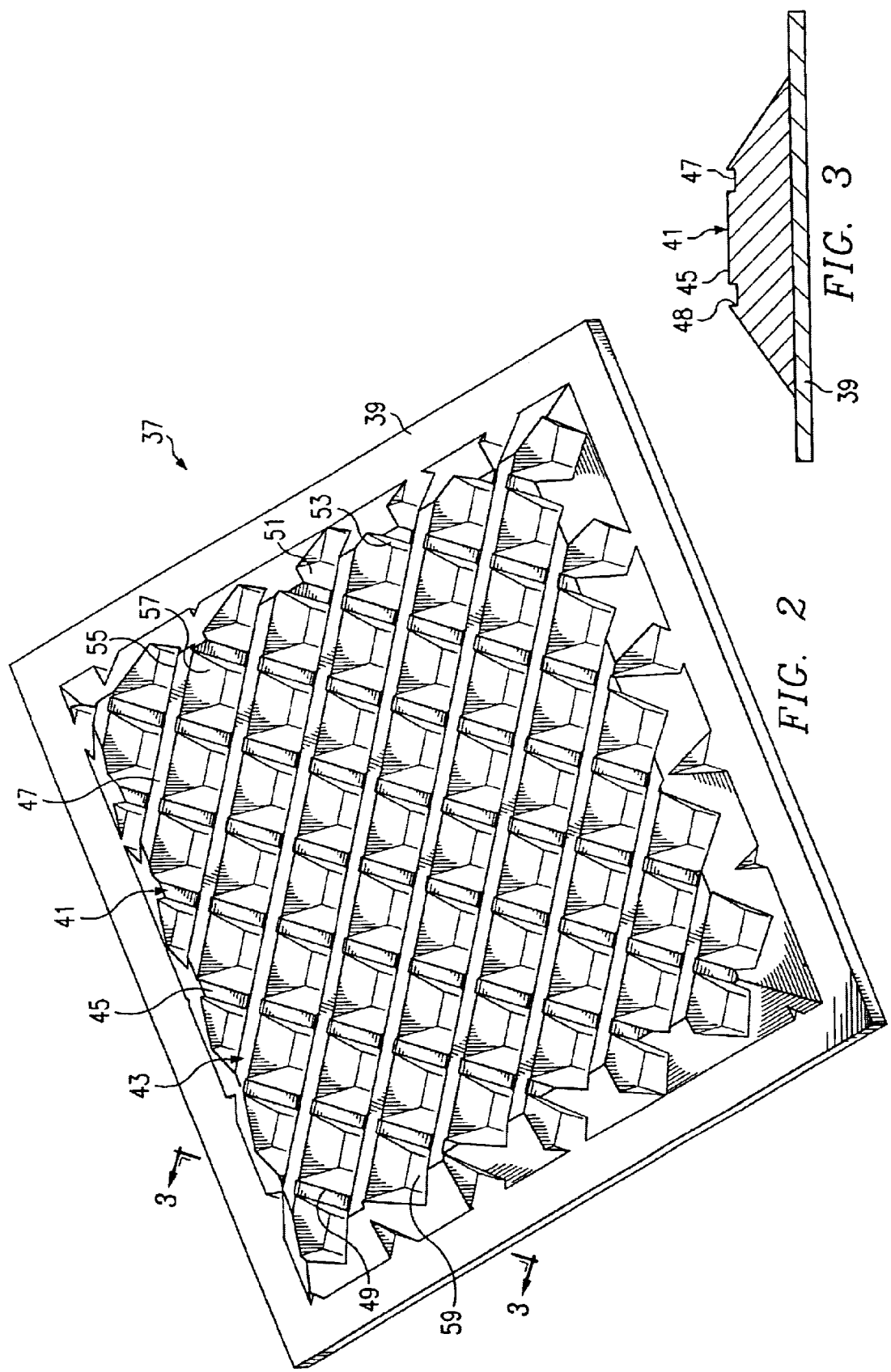

METHOD OF MAKING A WAFFLE STIFFENER

BACKGROUND OF THE INVENTION

1. Field of the Invention

This invention generally relates to the field of materials construction and, more specifically, to an apparatus and method for constructing a composite structure.

2. Description of the Prior Art

Composite structures are desirable in many industries for many applications. For example, aircraft, space, and land/sea vehicles employ a variety of curved and multiple-contoured surface structures in their fabrication. Composite materials are commonly used for these structures because, among other desirable attributes, composite materials have high strength-to-weight ratios. Even so, composite structures formed from composite materials still need to be stiffened in some instances. Therefore, manufacturers of composite structures are continually searching for better and more economical ways of stiffening composite structures.

There are various systems and methods of stiffening composite structures. For example, in an aircraft context, hat and blade stiffeners are sometimes utilized. However, a problem with hat and blade stiffeners is that they can have special peel problems at their ends. Furthermore, when utilizing hat and blade stiffeners for strength in perpendicular directions, it becomes very expensive from a manufacturing standpoint because hat and blade stiffeners do not lend themselves well to criss-cross patterns.

Another common stiffening method is the use of honeycomb structures. However, honeycomb structures are usually manufactured as a sandwich structure, which means that they can trap moisture within them, leading to degradation, and are limited in depth because of volume and weight considerations. In addition, manufacturing honeycomb structures can be very expensive.

An additional method of stiffening composite structures is the use of waffle structures. Waffle stiffening can achieve the depths of hat and blade stiffeners, without the peeling problems, and can achieve bi-directional strength by nature of their criss-cross patterns. In addition, waffle stiffeners, unlike honeycomb structures, consume less volume and can be made to not trap moisture or fuel, which can be detrimental in aircraft applications. However, waffle stiffening is not without its problems. Prior methods of constructing waffle stiffeners result in sub-standard waffle stiffeners because of folding or kinking problems during lay-up of the composite plies. In addition, prior waffle stiffeners are limited in depth because of strength considerations, which means that the span between supports cannot be extended or increased, which would save a considerable amount of money during manufacture.

SUMMARY OF THE INVENTION

An apparatus and method for stiffening a panel provides a composite waffle stiffener and the method for constructing the stiffener. A plurality of fabric plies pre-cut to a selected pattern are laid on a tool having a waffle configuration, the plies overlapping each other to maintain continuity of the structure. The resulting waffle stiffener is then bonded to a panel requiring stiffening. The stiffener is flexible and maybe bonded to curved panels. Holes in the stiffener allow access to the volume between the stiffener and the panel for minimizing volume loss within, for example, a wing structure containing fuel and for ventilating air or moisture trapped in the volume.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 2 is a perspective view of a tool for creating a waffle stiffener and in accordance with the present invention FIG. 3 is a cross-sectional view of the tool of FIG. 2 through section 3—3 of FIG. 2.

DETAILED DESCRIPTION OF THE INVENTION

Figure 1:
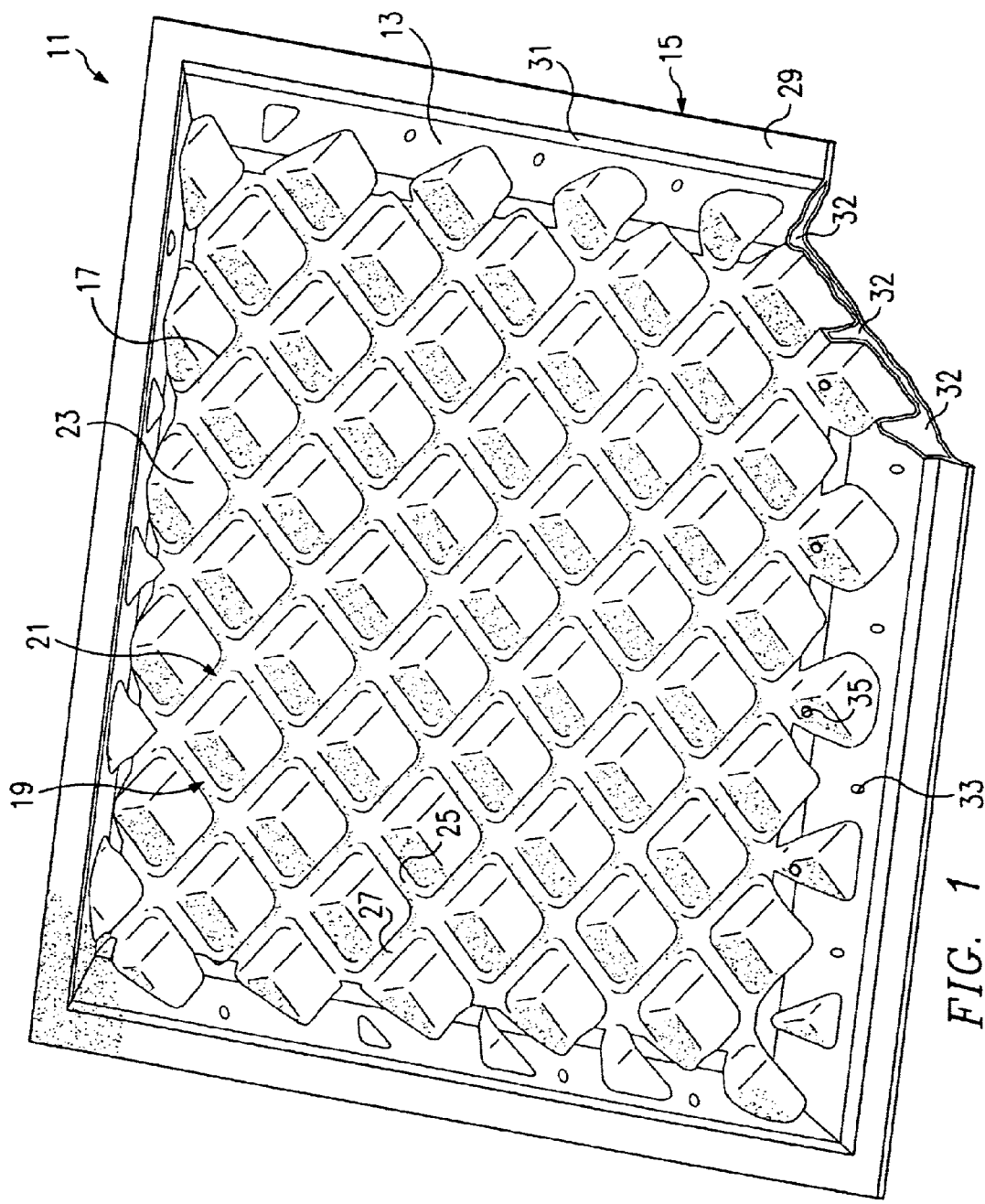
FIG. 1 is a perspective view of an aircraft skin stiffened by a composite waffle structure and constructed in accordance with the present invention.

Aircraft skin 11 comprises waffle stiffener 13 and panel 15. Panel 15 is preferably a generally-planar, composite component, though panel 15 may be somewhat curved. Panel 15 is preferably formed from materials such as, for example, carbon fibers, Kevlar fibers, or glass fibers, though panel 15 may also be formed from other rigid materials, such as aluminum. The thickness of panel 15 may be insufficient to provide the required bending and torsional stiffness for a particular application, thus requiring a stiffener to be attached to panel 15 to increase the stiffness thereof.

Stiffener 13 is a waffle structure that is preferably formed from composite fabrics and unidirectional fibers of the same composite materials described above, the particular material being selected to optimize various characteristics, such as strength and coefficient of thermal expansion. The waffle structure is defined by the formation of an array of pockets 17 by two sets of intersecting webs 19, 21, each web 19, 21 being formed from a fabric of woven fibers. Webs 19, 21 are shown as generally perpendicular to each other, though webs 19, 21 may be formed to be at other angles relative to each other. Each pocket 17 is formed as a base 23 surrounded by tapered portions of webs 19, 21. The upper portions of webs 19, 21 form cap regions, or crests, 25, 27, respectively. Stiffener 13 can be produced in various shapes and sizes, for example, each pocket 17 may have webs 19, 21 that may have horizontal lengths of 4 inches and a vertical depth of ½ inch. Though shown as a flat plane, stiffener 13 can also be formed with a curvature to match that of a curved outer panel that requires stiffening.

Stiffener 13 is bonded to panel 15 using an adhesive or other means between the inner side of each base 23 and the inner surface 29 of panel 15. Additionally, stiffener 13 is bonded to inner surface 29 at outer edge 31. The amount of bonding surface area can be increased by increasing the size of bases 23. Because of the three-dimensional shape of stiffener 13, a hollow volume 32 exists between stiffener 13 and panel 15. Holes 33, 35 located throughout stiffener 13 may provide for venting of moisture that accumulates in volume 32 between skin 15 and stiffener 13 or for access to volume 32 for fuel storage and recovery in a wing structure. By providing holes 33, 35, stiffener 13 minimizes the loss of available volume for fuel storage within the wing, since fuel would be able to flow into and out of volume 32 through holes 33, 35. By forming a portion of holes 33, 35 in webs 19, 21 near crests 25, 27 and a portion near outer bases 23, fuel may be substantially recovered from within volume 32 whether stiffener 13 is located above a lower wing surfaces or below an upper wing surfaces.

Tool 37, shown in FIG. 2, is used as a die to form stiffener 13 of FIG. 1. Tool 37 has a similar waffle structure as stiffener 13 and is preferably formed from a solid block of metal through any suitable process, such as machining. Tool 37 has a base 39 from which intersecting webs 41, 43 extend upward. Webs 41, 43 are shown as perpendicular to each other, though this is not required. Webs 41 extend for the desired height of tool 37 and terminate in crests 45, whereas crests 47 of webs 43 are located at a lower height than crests 45. FIG. 3 illustrates a cross-section of tool 37 along the section line 3—3 of FIG. 2 and shows crests 47 extending through web 41 and forming U-shaped channels 48. Referring again to FIG. 2, pockets 49 are formed between sidewalls 51, 53 of webs 41 and between sidewalls 55, 57, each pocket 49 having a base 59. As described below, layers of composite materials are laid over webs 41, 43 and within pockets 49 to form stiffener 13 (FIG. 1).

Figure 4:
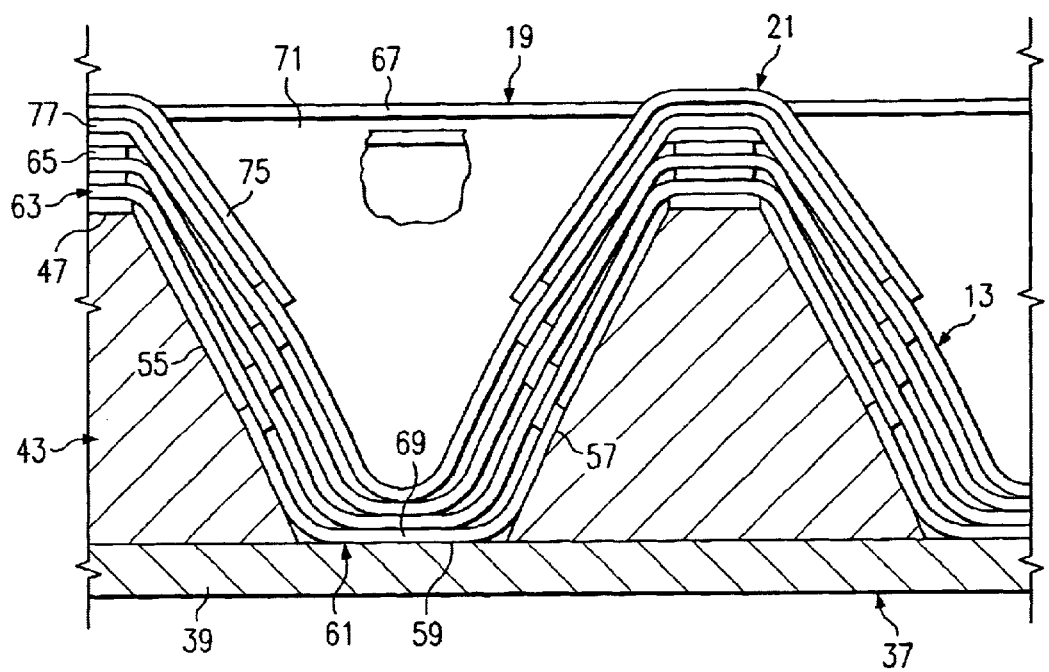
FIG. 4 is a cross-sectional view through the tool of FIG. 2 and the stiffener of FIG. 1, the stiffener being formed on the tool according to the present invention.

FIG. 4 is a cross-section through the middle of a row of pockets 49 parallel to webs 41. Stiffener 13 is located on tool 37, the cross-section revealing fabric plies 61, 63 that form webs 19, 21 of stiffener 13. Precision-cut fabric plies 61, 63 are strips that are laid on tool 37 with their lengths being parallel to webs 43. Multiple layers of overlapping fabric plies 61, 63 form the thickness of stiffener 13, which is preferably two to six layers thick. Fabric plies 61, 63 are cut from flat composite fabric, preferably made from woven carbon fibers, and are impregnated with a laminating resin that is cured before stiffener 13 is removed from tool 37 and bonded to a panel. Fabric plies 61, 63 encapsulate cap plies 65, 67 for tying together webs 19, 21 and for further cross-stiffening of stiffener 13. Cap plies 65, 67 are thin, rectangular strips and are preferably formed from unidirectional carbon fibers, extending for the length of webs 41, 43. Cap plies 65, 67 are equal in width to crests 47 and 45, respectively, and the ends of adjacent cap plies 65, 67 maybe staggered at the ends of webs 19, 21 to ease load introduction to webs 19, 21. When installed, it is preferable for the fibers of fabric plies 61, 63 to be +/−45° from the unidirectional fibers of cap plies 65, 67.

Figure 5:
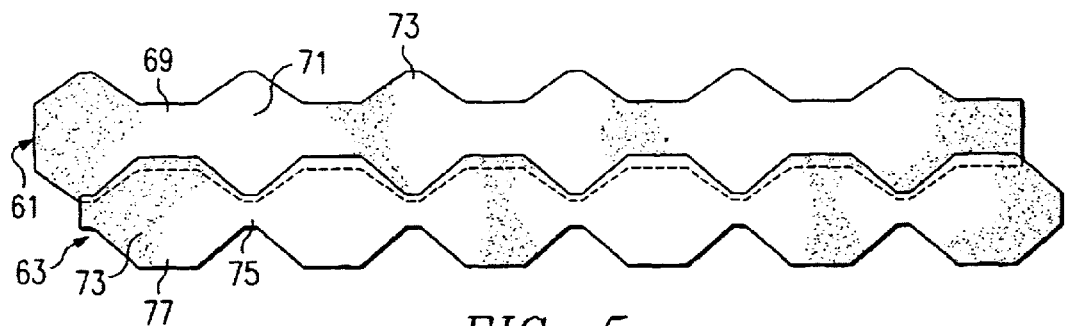
FIG. 5 is a plan view of fabric plies being formed n accordance with the present invention.

As shown in FIG. 5, fabric plies 61, 63 are strips, each comprising two portions that alternate in a repeating pattern for the length of fabric plies 61, 63 and have fibers oriented +/−45° from the length of plies 61, 63. Fabric ply 61 comprises rectangular base portions 69 and diamond-shaped web portions 71. Each base portion 69 is rectangular and sized to fit on base 59 of pockets 49, partially extending up sidewalls 55, 57 of webs 43. Web portion 71 is sized to wrap over sidewalls 51, 53 and crests 45 of webs 41. Each web portion 71 has two lateral extensions 73 that give web portion 71 a width slightly larger than the width between channels 48, providing for full coverage of sidewalls 51, 53 when web portion 71 is laid over webs 41.

Fabric ply 63 is a strip comprising hexagonal web portions 73 and rectangular channel portions 75. Each web portion 73 has two lateral extensions 77 for partially extending down sidewalls 55, 57 when fabric ply 63 is placed on crest 47. Channel portions 75 are narrow strips sized to fit within U-shaped channels 48 on webs 41. FIG. 5 also shows the amount of overlap of fabric ply 63 over fabric ply 61 when plies 61, 63 are laid on tool 37, the overlapped edge of fabric ply 61 being shown as a dotted line.

Referring again to FIG. 4, stiffener 13 is formed by laying fabric plies 61, 63 parallel to each other on tool 37. To form each row of pockets, the row being parallel to webs 43, a first fabric ply 61 is laid on tool 37 with base portions 69 centered in pockets 49. In each pocket 49, base portion 69 rests on base 59, the lateral edges of base portion 69 partially extending up sidewalls 55, 57 of webs 43. Web portions 71 extend over each sidewall 51 and (though not shown in this view) each sidewall 53 of adjacent webs 41. The angular shape of the edges of extensions 73 of web portions 71 corresponds to the shape of sidewalls 55, 57. Web portions 71 then extend over crest 45 of each web 41 and continue down into the next adjacent pocket, repeating this sequence for the length of the row of pockets 49.

After the first fabric ply 61 is installed, fabric ply 63 is laid on tool 37. Fabric ply 63 is laid along crest 47 of web 43, channel portions 75 aligning with channels 48 in webs 41 and extensions 77 aligning with sidewalls 55, 57. Extensions 77 extend downward on sidewalls 55, 57, the lower ends of extensions 77 overlapping the upper ends of the sides of base portion 69. The angular shape of the edges of extensions 77 of web portions 73 corresponds to the shape of sidewalls 55, 57. A press, having a waffle configuration and preferably made from silicone, is used in a hot-debulking process to compact fabric plies 61, 63 on tool 37 after the installation of each layer of stiffener 13.

To form the next layer of stiffener 13, a second fabric ply 61 is installed, the edges of fabric ply 61 overlapping the edges of the first fabric ply 63. Before the second fabric ply 63 is installed, though, a cap ply 65 is laid along crest 47 above and parallel to fabric ply 63. The second fabric ply 63 is now installed over cap ply 65, encapsulating cap ply 65. For the first layers of stiffener 13, only cap plies 65, which are parallel to crests 47, are used. After a number of layers of plies 63, 65 have been laid, the thickness above crests 47 is such that the upper surface of the next cap ply 65 is even with the upper surface of fabric plies 61 over crest 45. A cap ply 67 is laid above and parallel to crest 45 of web 41 for cross-stiffening of stiffener 13 in a direction parallel to webs 41 and perpendicular to that of cap plies 65 and fabric plies 61, 63. The thickness of stiffener 13 is increased as further layers are constructed by alternately stacking fabric plies 61 and 63 and placing cap plies 67 between layers.

Figure 6:
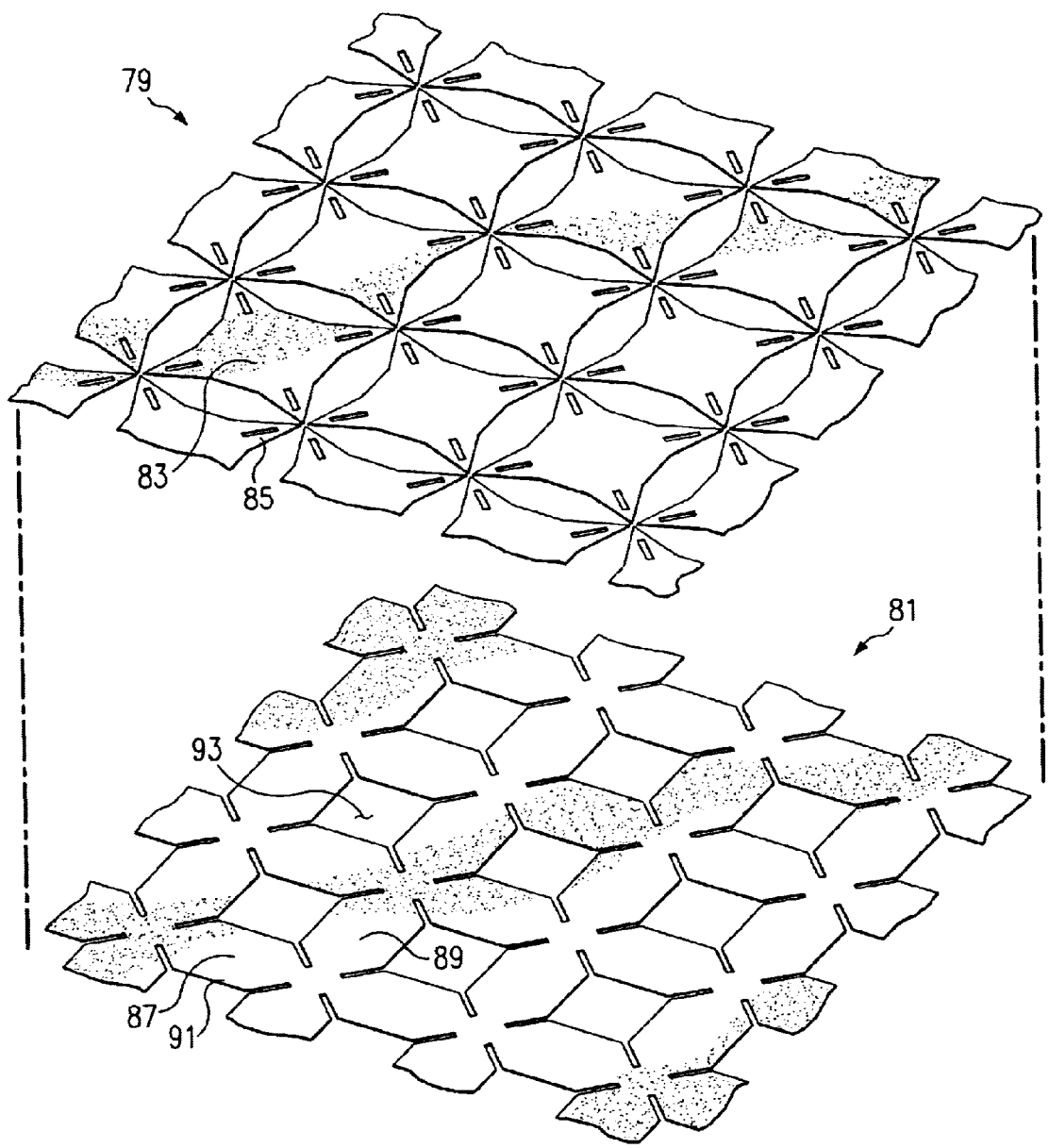
FIG. 6 is a perspective view of an alternate embodiment of the fabric plies of FIG. 5 and being in accordance with the present invention.

A second embodiment of stiffener 13 uses base ply 79 and fabric ply 81, shown in FIG. 6. To form base 23 of each pocket 17, base ply 79 is cut from flat, composite fabric to have multiple rows of base portions 83, each base portion having four corner portions 85. Base portions are sized to fit within pockets 49 of tool 37 with the outer edges of base portions partially extending up sidewalls 51, 53, 55, 57. Corner portions 85 are sized and shaped to fit in the corners formed at the intersections of sidewalls 51, 53, 55, 57. Fabric ply 81 is also cut from flat, composite fabric and provides for multiple rows of web portions 87, 89 sized to wrap over webs 41, 43 of tool 37. Each web portion 87, 89 has two lateral extensions 91 sized to lay on sidewalls 51, 53 and 55, 57 within each pocket 49 for forming the walls of pockets 17 of stiffener 13. Holes 93 are cut in fabric ply 81 for overlaying base portions. The edges of extensions 91 are shaped to follow the angles created at the intersections of sidewalls 51, 53, 55, 57. Because plies 79, 81 are symmetrical, each can be oriented so that rows of portions 83, 87, 89 are placed parallel to either web 41, 43.

To form stiffener 13 using plies 79, 81, base ply 79 is placed on tool 37, base portions 83 laying on and being centered in pockets 49. Corner portions 85 are positioned to align with the corners formed by sidewalls 51, 53, 55, 57. Next, fabric ply 81 is placed on tool 37, the rows of web portions 87, 89 being aligned with webs 41, 43 and being laid on crests 45, 47. Extensions 91 are laid on sidewalls 51, 53, 55, 57 to form the walls of pockets 17, extensions 91 overlapping the edges of base portions 83 and corner portions 85 of base ply 79. A hot-debulking process follows the installation of each layer.

The second layer is begun by placing a second base ply 79 on tool 37, the edges of the second base ply 81 overlapping the edges of the first fabric ply. As described in the previous embodiment, a unidirectional cap ply (not shown), like cap plies 65, 67 in FIG. 4, is placed above fabric ply 81 and along each crest 47 of web 43 prior to the next fabric ply 81 being laid on tool 37. This sequence repeats for approximately two layers, cap plies 65, 67 then being laid along web 41 in each successive layer until the desired thickness of stiffener 13 is produced.

A third embodiment of the invention, though not shown in the figures, comprises forming stiffener 13 using a fabric made of short, discontinuous fibers. The fabric is shaped to tool 37 using heat and an elastomeric press, the press being forced toward tool 37 with a vacuum. Cap plies are laid between layers of the fabric, first in a direction parallel to one of the crests 45, 47, then between other layers in a direction perpendicular to the first cap ply and parallel to the other of the crests 45, 47. The fabric and cap plies are impregnated with a resin that is cured before stiffener 13 is removed from tool 37.

The advantages of the present invention are many. The stiffeners formed using this process are strong, lightweight, and flexible, being able to flex for bonding to contoured surfaces. Together with holes at selected locations, the three-dimensional structure provides for a minimal loss of volume within a wing structure or for ventilation of trapped air and moisture. The method of forming the stiffeners is quick and relatively inexpensive, providing for cost and labor efficiency in manufacturing. An additional advantage is that peeling between a waffle-stiffening structure and an aircraft skin, for example, is significantly reduced. The quality of waffle stiffening structures is improved by substantially reducing or eliminating any folds, kinks, bumps, or other imperfections when laying composite plies on a tool. Waviness in cap plies is minimized or eliminated by placing each cap ply in a different plane.

While the invention has been shown in only some of its forms, it is not thus limited but is susceptible to various changes and modifications without departing from the spirit thereof.

We claim:

1. A method of constructing a composite waffle stiffener, comprising:
    forming a die having a waffle configuration, the waffle configuration being a plurality of generally-parallel first webs extending in a first direction and a plurality of generally-parallel second webs extending in a second direction and intersecting the first webs to form pockets, each pocket having four sidewalls and a base; then
        layering a plurality of fabric plies on the die, the fabric plies conforming to the waffle configuration and having cap regions defined by crests of the first and second webs; and
        disposing a plurality of unidirectional cap plies between the fabric plies such that the unidirectional cap plies extend along the cap regions in the first direction.

2. The method of claim 1, wherein:
the first and second webs are perpendicular to each other.

3. The method of claim 1, wherein:
disposing the plurality of unidirectional cap plies between the fabric plies comprises positioning the unidirectional cap plies to extend along the cap regions in the first direction and a second direction.

4. The method of claim 1, wherein:
disposing the plurality of unidirectional cap plies between the fabric plies comprises laying the unidirectional cap plies along a length of the cap regions such that the unidirectional cap plies are substantially flat.

5. The method of claim 1, wherein:
disposing the plurality of unidirectional cap plies between the fabric plies comprises laying the unidirectional cap plies to extend along the cap regions in the first direction and a second direction such that the unidirectional cap plies are substantially flat.

6. The method of claim 1, further comprising:
cutting the fabric plies to a predetermined pattern such that the fabric plies conform to the waffle configuration.

7. The method of claim 1, wherein:
each of the fabric plies is a strip, the fabric plies being laid side-by-side in the same direction on the die and having overlapping edges.

8. The stiffener of claim 1, wherein:
the fabric plies are first and second sheets cut to a predetermined pattern for conforming to a shape of the die, the sheets having overlapping portions; and wherein
    the first sheet forms the crests and upper portions of the webs and the second sheet forms a base of each pocket and lower portions of the webs.

9. A method of constructing a composite waffle stiffener, comprising:
    forming a die having a waffle configuration, the waffle configuration being a plurality of generally-parallel first webs extending in a first direction and a plurality of generally-parallel second webs extending in a second direction and intersecting the first webs to form pockets, each pocket having four sidewalls and a base; then
        layering a plurality of fabric plies on the die, the fabric plies conforming to the waffle configuration and having cap regions defined by crests of the first and second webs; and
        disposing a plurality of unidirectional cap plies between the fabric plies such that the unidirectional cap plies extend along the cap regions in the first direction and the second direction.

10. The method of claim 9, wherein:
the first and second webs are perpendicular to each other.

11. The method of claim 9, wherein:
the unidirectional cap plies are substantially flat.

12. The method of claim 9, further comprising:
cutting the fabric plies to a predetermined pattern such that the fabric plies conform to the waffle configuration.

13. The method of claim 9, wherein:
each of the fabric plies is a strip, the fabric plies being laid side-by-side in the same direction on the die and having overlapping edges.

14. The method of claim 9, wherein:
the fabric plies are first and second sheets cut to a predetermined pattern for conforming to a shape of the die, the sheets having overlapping portions; and wherein the first sheet forms the crests and upper portions of the webs and the second sheet forms a base of each pocket and lower portions of the webs.

* * * * *